(12) United States Patent
Won et al.

(10) Patent No.: US 10,553,950 B2
(45) Date of Patent: Feb. 4, 2020

(54) ANTENNA MODULE AND ELECTRONIC DEVICE HAVING THE SAME

(71) Applicant: WITS Co., Ltd., Yongin-si, Gyeonggi-do (KR)

(72) Inventors: Jae Sun Won, Suwon-si (KR); Hee Seung Kim, Suwon-si (KR); Jae Hyuk Jang, Suwon-si (KR); Chang Hee Lee, Suwon-si (KR); Gie Hyoun Kweon, Suwon-si (KR); Hyo Jung Yoon, Suwon-si (KR); Young Seung Roh, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/836,965

(22) Filed: Dec. 11, 2017

(65) Prior Publication Data

US 2019/0027827 A1  Jan. 24, 2019

(30) Foreign Application Priority Data

Jul. 20, 2017  (KR) .......................... 10-2017-0091924

(51) Int. Cl.
*H01Q 1/24* (2006.01)
*H01Q 7/06* (2006.01)
*H01Q 1/22* (2006.01)

(52) U.S. Cl.
CPC ................. *H01Q 7/06* (2013.01); *H01Q 1/22* (2013.01)

(58) Field of Classification Search
CPC . H01Q 7/00; H01Q 1/36; H01Q 11/08; H01Q 1/38; H01Q 1/362; H01Q 9/27; H01Q 21/24; H01Q 1/21; H01Q 7/06

USPC ......................................... 343/702, 879, 895
See application file for complete search history.

(56) References Cited

U.S. PATENT DOCUMENTS

| 10,177,179 B2* | 1/2019 | Jang .................. H01Q 1/44 |
| 2008/0297421 A1* | 12/2008 | Kriebel .............. G06K 19/0716 343/702 |
| 2012/0098711 A1* | 4/2012 | Yosui ................. G06K 7/10336 343/702 |
| 2012/0313742 A1* | 12/2012 | Kurs .................... B60L 11/182 336/180 |
| 2013/0229319 A1* | 9/2013 | Miura .................... H01Q 7/06 343/788 |
| 2014/0168019 A1* | 6/2014 | Hirobe .................... H01Q 5/40 343/720 |
| 2014/0300526 A1* | 10/2014 | Rahman .................. H01Q 7/00 343/867 |
| 2017/0178803 A1* | 6/2017 | Kim ........................ H02J 50/10 |
| 2017/0194711 A1* | 7/2017 | Nakano .................... H01Q 7/00 |

(Continued)

FOREIGN PATENT DOCUMENTS

| KR | 10-1548277 B1 | 8/2015 |
| KR | 10-1715901 B1 | 3/2017 |

*Primary Examiner* — Linh V Nguyen
(74) *Attorney, Agent, or Firm* — Harness, Dickey & Pierce, P.L.C.

(57) ABSTRACT

An antenna module includes a wiring part including a second antenna wiring disposed to have a spiral shape on an insulating substrate and a first antenna wiring disposed in an internal region of the second antenna wiring and disposed in a solenoid structure; a first magnetic part disposed to be inserted into the center of the solenoid structure and having at least a portion exposed externally from the wiring part; and a second magnetic part coupled to the first magnetic part.

17 Claims, 9 Drawing Sheets

(56) References Cited

U.S. PATENT DOCUMENTS

| | | | |
|---|---|---|---|
| 2018/0069299 A1* | 3/2018 | Kang | H01Q 7/00 |
| 2018/0107913 A1* | 4/2018 | Shi | H04B 5/0031 |
| 2018/0254552 A1* | 9/2018 | Ito | H02J 50/12 |

* cited by examiner

II-II'

ANTENNA MODULE AND ELECTRONIC DEVICE HAVING THE SAME

CROSS-REFERENCE TO RELATED APPLICATION(S)

This application claims benefit under 35 USC § 119(a) of Korean Patent Application No. 10-2017-0091924 filed on Jul. 20, 2017 in the Korean Intellectual Property Office, the entire disclosure of which is incorporated herein by reference for all purposes.

BACKGROUND

1. Field

The following description relates to an antenna module which is mounted in an electronic device and is used for short-range communications and an electronic device having the same.

2. Description of Related Art

As portable terminals such as smartphones become widespread and functions thereof are improved, a payment method using the short-range communications function of portable terminals has emerged. However, since a data transmission channel may not be present between a POS terminal which is conventionally and commonly installed in a store or the like and smartphones, payments using smartphones face many obstacles. In order to overcome such obstacles, methods using a 2D barcode or near field communication (NFC) have been proposed.

In addition, a magnetic secure transmission (MST) method capable of performing payments without adding a separate reading apparatus to a POS terminal has recently been proposed.

Thereby, both an NFC antenna and an MST antenna may be mounted in a single one portable terminal, and accordingly, an antenna module capable of maintaining communications performance of the respective antennas in the portable terminal is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna module includes a wiring part including a second antenna wiring disposed in a spiral shape on an insulating substrate and a first antenna wiring disposed in an internal region of the second antenna wiring, and disposed in a solenoid structure, a first magnetic part disposed in the center of the solenoid structure and including a portion exposed externally from the wiring part, and a second magnetic part coupled to the first magnetic part.

The second magnetic part may be surface-bonded to the first magnetic part that is exposed externally from the wiring part.

The insulating substrate may include a first substrate disposed on a first surface of the first magnetic part and extending externally from the first magnetic part, and a second substrate disposed on a second surface of the first magnetic part and extending externally from the first magnetic part, and the first substrate and the second substrate may be connected to each other externally of the first magnetic part.

The first antenna wiring may include a first pattern disposed on the first substrate, a second pattern disposed on the second substrate, and interlayer connection conductors disposed to penetrate through the first substrate and the second substrate and connecting the first pattern and the second pattern to each other.

The interlayer connection conductors may be disposed spaced apart from the first magnetic part.

The insulating substrate may further include a third substrate disposed to extend externally of the first magnetic part and interposed between the first substrate and the second substrate.

The third substrate may have substantially the same thickness as the first magnetic part.

The second antenna wiring may be disposed on the first substrate.

The wiring part may include contact pads connected to opposite ends of the first antenna wiring and opposite ends of the second antenna wiring, respectively.

The wiring part may include a connection wiring, connecting the first antenna wiring and the contact pads with each other, and the connection wiring may be disposed on the second substrate.

The first magnetic part and the second magnetic part may have different magnetic permeabilities.

The first magnetic part and the second magnetic part may include the same material and may be formed by varying fragmentation.

In one general aspect, an electronic device includes an antenna module wherein the antenna module comprises a wiring part comprising a first antenna wiring disposed in a solenoid structure, a first magnetic part disposed in the center of the solenoid structure, and a second magnetic part coupled to the first magnetic part, a case comprising an internal space, a side cover, and a rear cover, wherein the antenna module is disposed in the internal space of the case, and wherein a side of the second magnetic part is disposed to be adjacent to the side cover of the case.

The antenna module may further include a second antenna wiring disposed on a side surface of the first magnetic part.

The second antenna wiring may be disposed in a spiral shape, and the first antenna wiring may be disposed in an internal region of the second antenna wiring.

The second antenna wiring may be disposed to face the rear cover.

The electronic device may conduct short range communications through the antenna module.

The electronic device may comprise a cellular phone, a notebook, a tablet personal computer, or a wearable device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
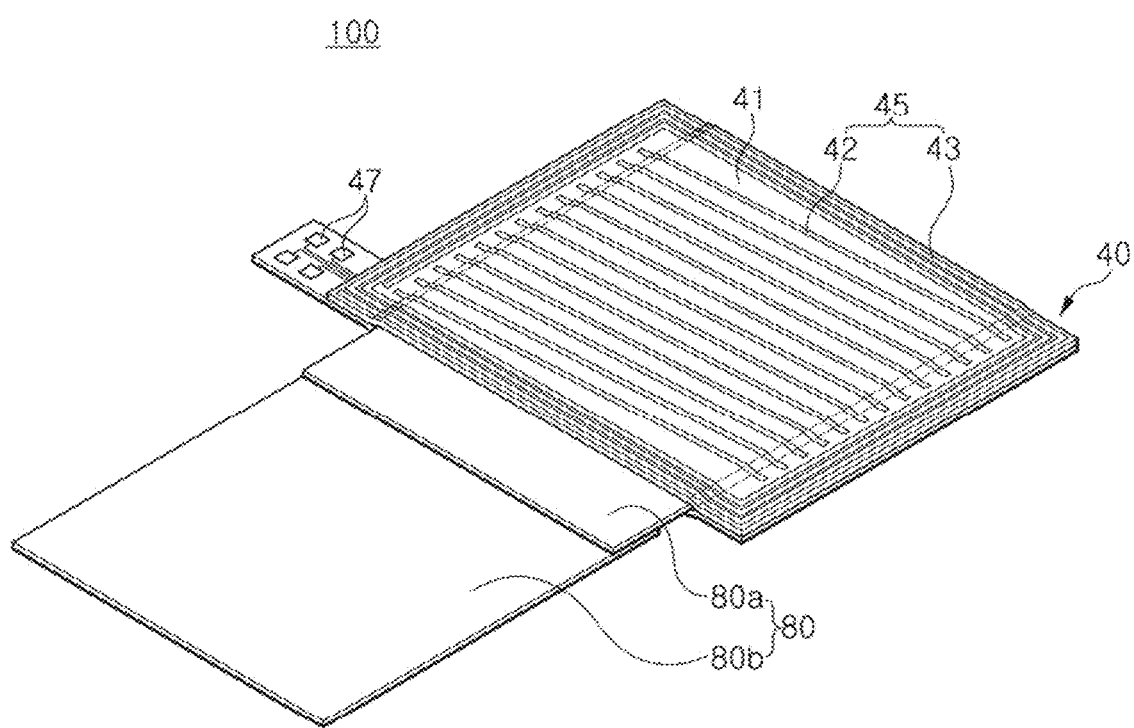
FIG. 1 is a perspective view of an antenna module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
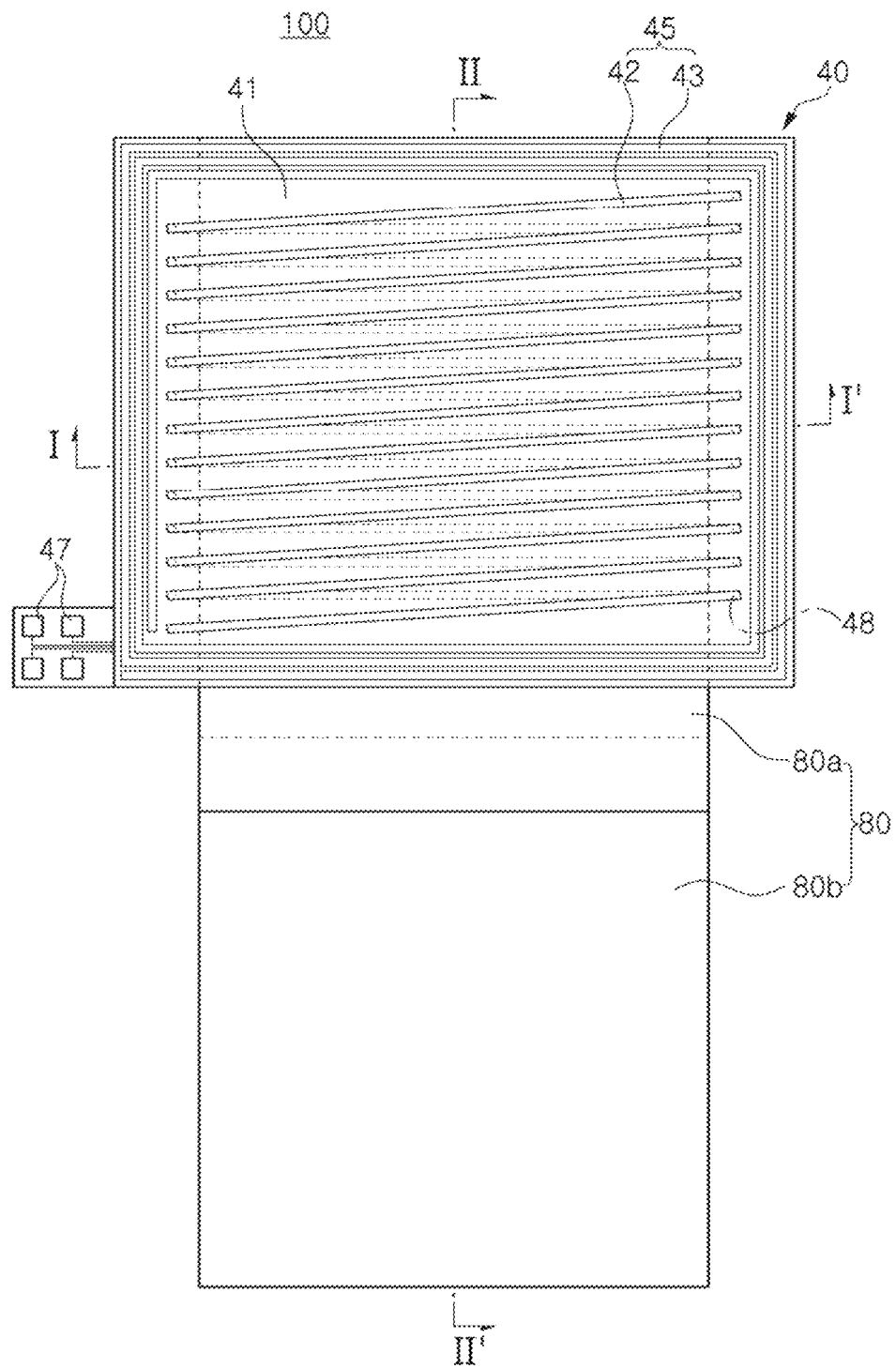
FIG. 2 is a plan view of the antenna module illustrated in FIG. 1.
Figure 3:
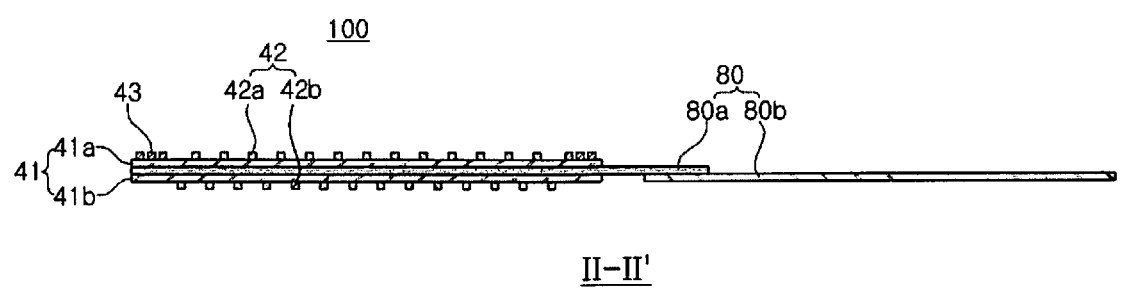
FIG. 3 is a cross-sectional view taken along a line II-II' of FIG. 2.
Figure 4:
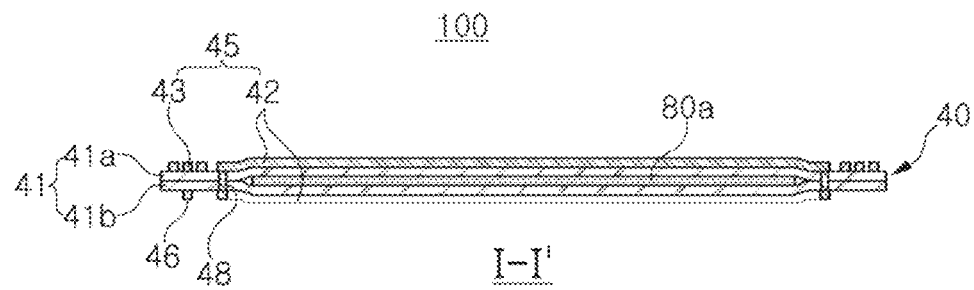
FIG. 4 is a cross-sectional view taken along a line I-I' of FIG. 2.
Figure 5:
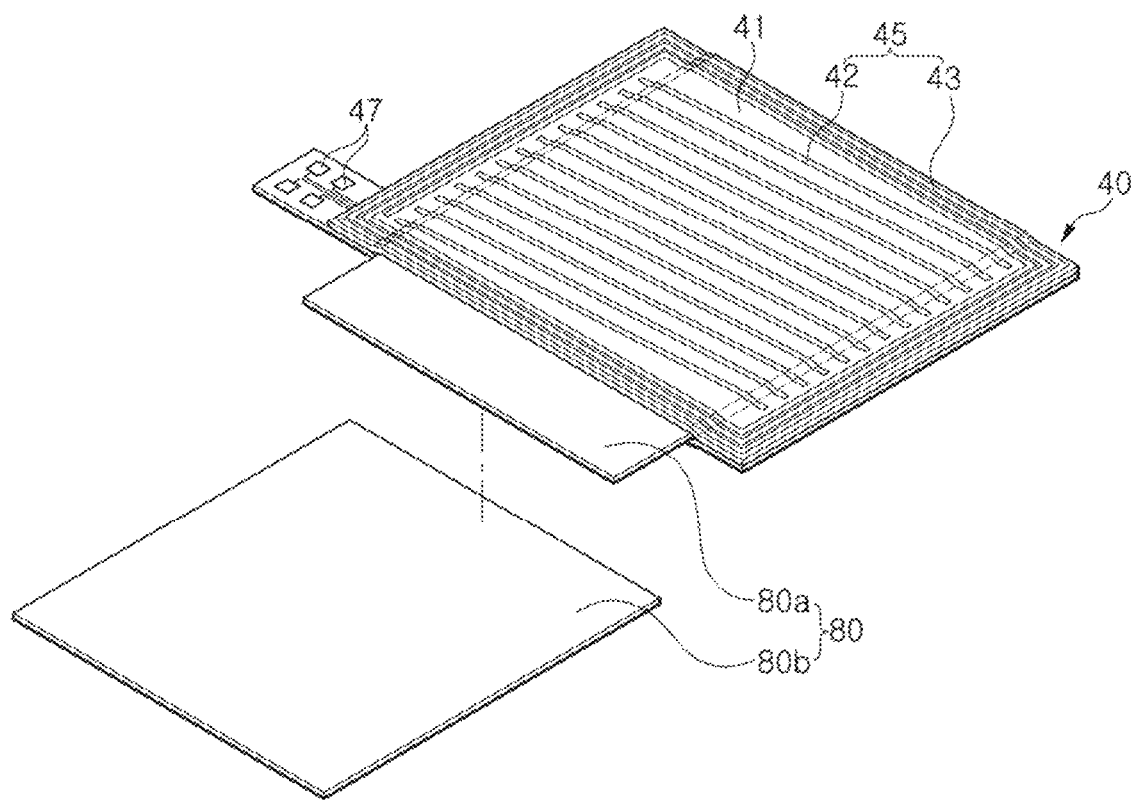
FIG. 5 is an exploded perspective view of the antenna module illustrated in FIG. 1.

FIG. 1 is a perspective view of an antenna module according to an embodiment, FIG. 2 is a plan view of the antenna module illustrated in FIG. 1, and FIG. 3 is a cross-sectional view taken along a line II-II' of FIG. 1. Further, FIG. 4 is a cross-sectional view taken along a line I-I' of FIG. 1 and FIG. 5 is an exploded perspective view of the antenna module shown in FIG. 1.

Referring to FIGS. 1 through 5, an antenna module 100 according to an embodiment, which is an antenna module which is mounted in an electronic device and is used for short-range communications, includes a wiring part 40 and a magnetic part 80.

The wiring part 40 may have a form of a substrate. In more detail, the wiring part 40 includes an insulating substrate 41 and an antenna wiring 45 formed on the insulating substrate 41.

The insulating substrate 41 refers to a substrate on which a circuit wiring is formed on one surface or opposite surfaces thereof, and for example, an insulating film (e.g., a polyimide film) may be used. In this case, the wiring part 40 has a form of a flexible printed circuit board (PCB). However, the wiring part 40 is not limited thereto, but various kinds of substrates (e.g., a printed circuit board, a ceramic substrate, a glass substrate, an epoxy substrate, a flexible substrate, and the like) which are known in the art may be selectively used as long as the circuit wiring may be formed on the opposite surfaces thereof.

According to an embodiment, the insulating substrate 41 includes a first substrate 41a disposed on one surface (e.g., the first surface) of opposite surfaces of the first magnetic part 80a to be described below, and a second substrate 41b disposed on the other surface (e.g., the second surface) of the first magnetic part 80a. Therefore, the first magnetic part 80a is interposed between the first substrate 41a and the second substrate 41b and stacked in a sandwich form.

Both the first substrate 41a and the second substrate 41b have a width wider than the first magnetic part 80a, and portions thereof extended externally from the first magnetic part 80a may be bonded and connected to each other. Interlayer connection conductors 48 to be described below may be disposed on the portion at which the first substrate 41a and the second substrate 41b are bonded to each other.

A portion of a first antenna wiring 42, and a second antenna wiring 43 to be described below are disposed on the first substrate 41a. In addition, the remaining portion of the first antenna wiring 42, a lead wiring 46, and a contact pad 47 are disposed on the second substrate 41b.

The antenna wiring 45 is formed on the insulating substrate 41 and has a form of a circuit wiring formed of a copper foil or the like.

The antenna wiring 45 according to an embodiment is manufactured by patterning double sided copper clad laminates (CCL). In addition, the antenna wiring 45 may be formed by performing a photolithography method for the opposite surfaces of a flexible insulating substrate such as a film, and the wiring part 40 may be manufactured, for example in the flexible PCB (FPCB) having a double sided structure.

Accordingly, the wiring part 40 according to an embodiment has a thickness which is significantly thin. However, the wiring part 40 may be manufactured in a multilayer substrate, or may also be manufactured in a form of the printed circuit board (PCB) having rigidity, as needed.

The antenna wiring 45 may have a form in which the antenna wiring 45 is embedded in the insulating substrate 41 or a form in which the antenna wiring 45 protrudes from the insulating substrate 41. Further, the antenna wiring 45 may be formed of a single line coil, or may be formed of a coil of a Litz wire form formed of several strands.

The antenna wiring 45 according to an embodiment includes a first antenna wiring 42, a second antenna wiring 43, a lead wiring 46, and a contact pad 47.

The first antenna wiring 42 is formed as a wiring having a solenoid structure and the second antenna wiring 43 is formed as a wiring having a spiral shape.

The first antenna wiring 42 includes a first pattern 42a disposed on the first substrate 41a, a second pattern 42b disposed on a second substrate 41b, and interlayer connection conductors 48 that connect the first pattern 42a and the second pattern 42b with each other. The interlayer connection conductors 48 penetrate through the first substrate 41a and the second substrate 41b and electrically connect the first pattern 42a and the second pattern 42b with each other.

As described above, the interlayer connection conductors 48 are disposed at the portion of the insulating substrate extended externally from the first magnetic part 80a. Therefore, the interlayer connection conductors 48 may be disposed to be spaced apart from the first magnetic part 80a, that is, not to be in contact with the first magnetic part 80a.

The first pattern 42a and the second pattern 42b includes linear patterns, and opposite ends of each of the linear patterns are connected to the interlayer connection conductor 48. Therefore, the first antenna wiring 42 completes one turn by continuously connecting the first pattern 42a, the interlayer connection conductor 48, the second pattern 42b, and the interlayer connection conductor 48, and these turns may be repeatedly disposed to complete the wiring having a solenoid structure.

By such a structure, a half of the first antenna wiring 42 is disposed on the first surface (e.g., an upper surface) of the insulating substrate 41, and the remaining half thereof is disposed to be distributed on the second surface (e.g., a lower surface) of the insulating substrate 41. Further, the first antenna wiring 42 may have the solenoid structure having the first magnetic part 80a as a shaft.

The first antenna wiring 42 may be used as a magnetic secure transmission (MST) antenna. However, the first antenna wiring 42 is not limited thereto.

The second antenna wiring 43 is disposed on the first substrate 41a, and may be entirely exposed to the outside of a magnetic part 80 to be described below. According to an embodiment, the second antenna wiring 43 is disposed on an outer surface of the first substrate 41a, which is the first surface of the insulating substrate 41, but is not limited thereto, and may be variously modified. For example, the second antenna wiring 43 may be disposed on an inner surface of the first substrate 41a or disposed to be distributed on the opposite surfaces of the first substrate 41a, as needed.

An overall contour of the second antenna wiring 43 may be an annular shape (or a ring shape). Therefore, the second antenna wiring 43 may be disposed along an outer portion of the first substrate 41a and an empty internal region in which the second antenna wiring 43 is not formed may be provided with the center of the second antenna wiring 43.

The first antenna wiring 42 may be disposed in the internal region of the second antenna wiring 43. Therefore, the second antenna wiring 43 may be disposed on an outer side of the first antenna wiring 42 so as to accommodate the first antenna wiring 42 therein.

The second antenna wiring 43 may be used as a near field communication (NFC) antenna. However, the second antenna wiring 43 is not limited thereto.

The lead wiring 46 (FIG. 4) connects opposite ends of the first antenna wiring 42 and the second antenna wiring 43 with the contact pad 47. According to an embodiment, the lead wiring 46 is disposed on the second substrate 41b, but may also be formed on the first substrate 41a as needed.

In an embodiment, the lead wiring 46 is shown in FIG. 4 for convenience of explanation. The lead wiring 46 shown in FIG. 4, which is a wiring connecting one end of the first antenna wiring 42 with the contact pad 47, is disposed in a region of the second substrate 41b in which the first antenna wiring 42 is not formed.

The contact pad 47 may be disposed on the second substrate 41b. The contact pad 47 is connected to the antenna wiring 45 to electrically connect the circuit board of the electronic device on which the antenna module is mounted with the antenna wiring 45.

According to an embodiment, the contact pad 47 includes the contact pad 47 connected to the first antenna wiring 42 and the contact pad 47 connected to the second antenna wiring 43. Further, the opposite ends of the first antenna wiring 42 and the second antenna wiring 43 are connected to the contact pad 47 through the interlayer connection conductors 48 and the lead wiring 48 formed on the second substrate 41b.

Meanwhile, referring to FIG. 2, although an embodiment illustrates an example in which the contact pad 47 is disposed to protrude to the left side of the wiring part 40, the configuration of the present disclosure is not limited thereto. For example, the contact pad 47 may also be disposed to protrude to the right side or the upper side of the wiring part 40. Further, the contact pad 47 may be variously modified. For example, the contact pads 47 may be disposed on a rear surface of the second substrate 41b without having the protruding portion, and the like.

The magnetic part 80 may be used as a magnetic path of a magnetic field generated by the antenna wiring 45 of the wiring part 40 and efficiently forms the magnetic path of the magnetic field. To this end, the magnetic part 80 may be formed of a material capable of easily forming the magnetic path, and for example, a material having magnetic permeability such as a ferrite, a nanocrystal magnetic material, an amorphous magnetic material, a silicon steel plate, or the like may be used.

The magnetic part 80 may be formed to have a flat plate shape like a sheet and include a first magnetic part 80a and a second magnetic part 80b.

The first magnetic part 80a may be disposed to be inserted into the wiring part 40. In detail, the first magnetic part 80a may be interposed between the first substrate 41a and the second substrate 41b and disposed in the solenoid structure formed by the first antenna wiring 43 of the wiring part 40.

The first magnetic part 80a may have one side protruding to the outside of the wiring part 40. In addition, the second magnetic part 80b may be coupled to the portion of the first magnetic part 80a protruding to the outside of the wiring part 40.

The second magnetic part 80b is disposed outside the wiring part 40 and coupled to one surface of the first magnetic part 80a (e.g., a lower surface of the first magnetic part). In this case, a portion of the second magnetic part 80b overlaps the first magnetic part 80a and surface-bonded to the first magnetic part 80a. Meanwhile, the coupled position of the second magnetic part 80b is not limited to one surface of the first magnetic part 80a, and the second magnetic part 80b may also be coupled to the other surface of the first magnetic part 80a.

The first magnetic part 80a and the second magnetic part 80b may be coupled to each other through a separate adhesive member (not illustrated). The adhesive member may be interposed between the first magnetic part 80a and the second magnetic part 80b to bond the first magnetic part 80a and the second magnetic part 80b to each other. As such an adhesive member, an adhesive sheet or an adhesive tape may be used, and the adhesive member may also be formed by coating a surface of the wiring part 40 or the magnetic part 80 with an adhesive or a resin having adhesive property.

In addition, the adhesive member may also have magnetic property by configuring the adhesive member to contain ferrite powders.

The second magnetic part 80b has the same or similar width as the first magnetic part 80a. However, the width of the second magnetic part 80b is not limited thereto but may be variously modified. For example, the second magnetic part 80b may have the width wider than the first magnetic part 80a or have the width narrower than the first magnetic part 80a.

Further, a length of the second magnetic part 80b may be defined to correspond to an internal space or an internal structure of the electronic device in which the antenna module is mounted.

According to an embodiment, the first magnetic part 80a and the second magnetic part 80b are formed of different materials.

However, the first magnetic part 80a and the second magnetic part 80b are not limited thereto, but may also be formed of the same material. In this case, the first magnetic part 80a and the second magnetic part 80b may have different magnetic permeabilities.

For example, the permeability may be adjusted by forming the first magnetic part 80a and the second magnetic part 80b of the same material and then varying fragmentation of the first magnetic part 80a and the second magnetic part 80b.

The antenna module 100 according to an embodiment configured as described above may be manufactured by an operation of coupling the wiring part 40 and the first magnetic part 80a to each other and an operation of coupling the second magnetic part 80b to the first magnetic part 80a.

Meanwhile, in an embodiment, it may be considered that the antenna module is manufactured in a size of the coupled first and second magnetic parts 80a and 80b by extending a size of the first magnetic part 80a without separately forming the first magnetic part 80a and the second magnetic part 80b.

In this case, since the size of the magnetic part 80 is fixed, it is difficult to utilize the corresponding antenna module in various sizes of the electronic devices. According to an embodiment, however, when the first magnetic part 80a and the second magnetic part 80b are separately formed, the second magnetic part 80b is manufactured in various sizes and coupled to the first magnetic part 80a. Therefore, the antenna module is easily mounted in various sizes of the electronic devices by changing only the configuration of the second magnetic part 80b.

Further, in a case in which cost for manufacturing the first magnetic part 80a is high, the first magnetic part 80a manufactured to have the wide area as described above acts as a factor increasing manufacturing costs. According to an embodiment, however, when the first magnetic part 80a and the second magnetic part 80b are separately formed, the second magnetic part 80b is manufactured of a magnetic material having low manufacturing cost, thereby significantly reducing manufacturing costs.

Further, in the antenna module according to an embodiment, since the magnetic field generated by the first antenna wiring 42 is formed (P1 in FIG. 8) along a surface direction of the antenna module 100 through the first magnetic part 80a and the second magnetic part 80b, a shape or a direction of the magnetic field generated by the first antenna wiring 42 is adjusted to a specific direction.

In addition, the antenna module according to an embodiment increases efficiency of the antenna module while significantly reducing the size of the wiring part 40 on which the antenna wirings are disposed.

Figure 6A:
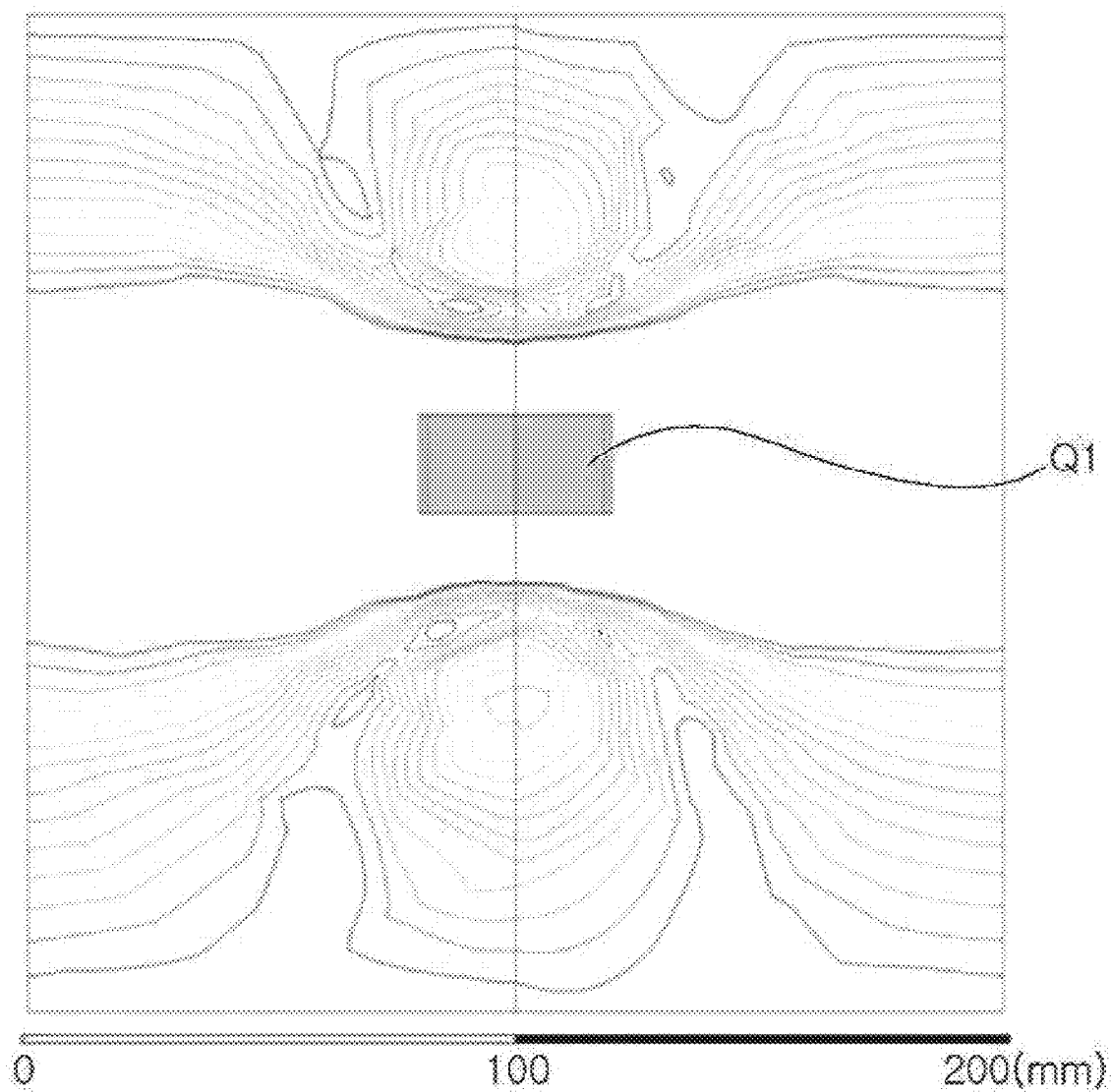
FIGS. 6A through 6C are views showing efficiency of the antenna module according to an embodiment.
Figure 6B:
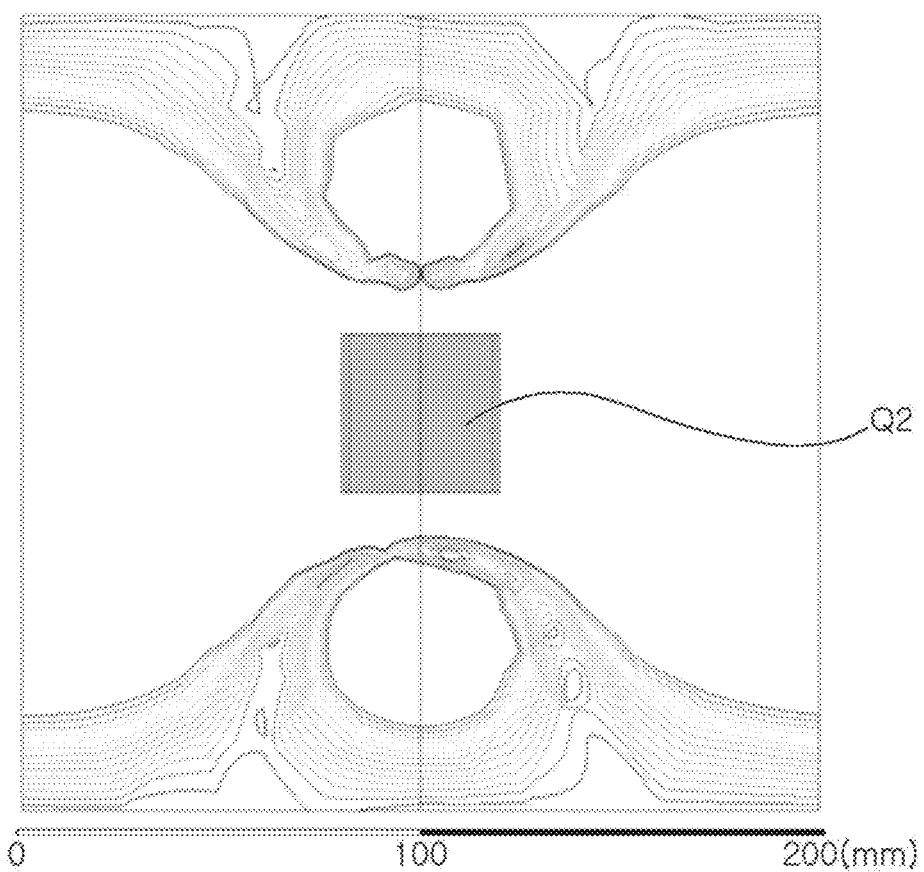
Figure 6C:
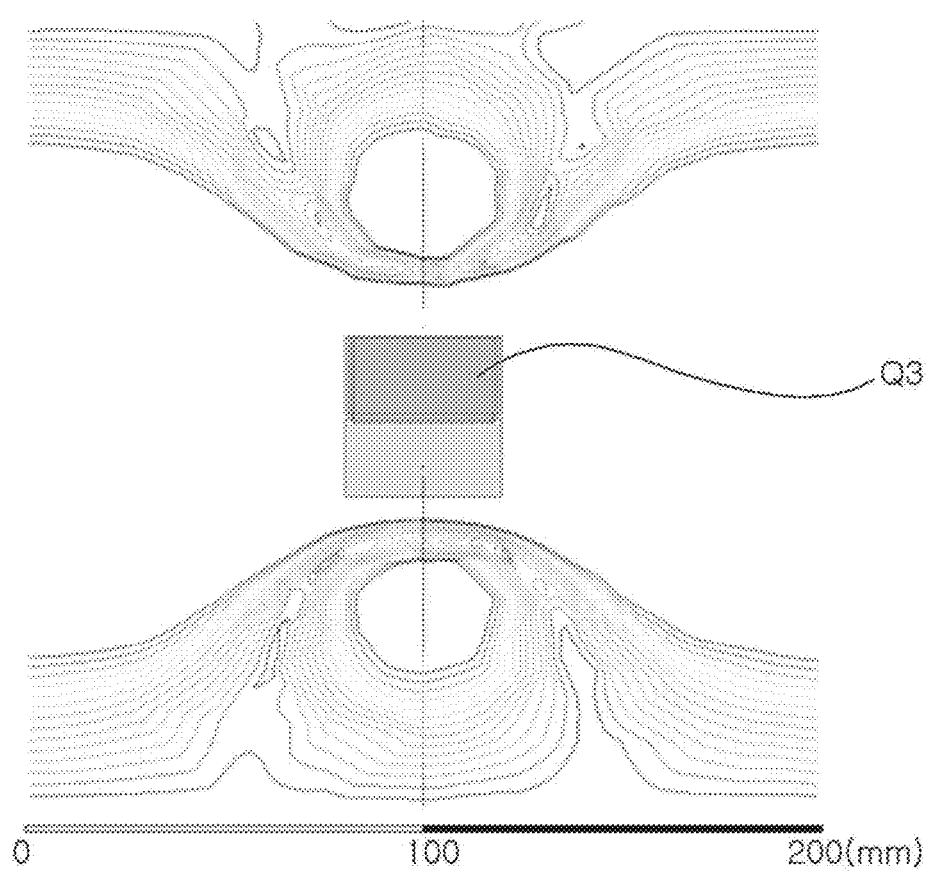

FIGS. 6A through 6C are views illustrating efficiency of the antenna module according to an embodiment and are views illustrating simulation results of a recognition rate of MST communications using the first antenna wiring around the antenna module.

FIG. 6A is a view illustrating the recognition rate of a case in which an antenna module Q1 is formed by only the first magnetic part, wherein the first antenna wiring may include 23 turns. Further, FIG. 6B illustrates a recognition rate of an antenna module Q2 in which an area of the wiring part and the first magnetic part is two times of that of FIG. 6A and the first antenna wiring includes 33 turns. In addition, FIG. 6C is a view illustrating a recognition rate of an antenna module Q3 according to an embodiment, wherein the first antenna wiring may include 23 turns. In other words, in the antenna module Q3 according to an embodiment illustrated in FIG. 6C, the wiring part and the first magnetic part were formed in the same size as FIG. 6A and the second magnetic part was coupled to the first magnetic part.

In FIGS. 6A through 6C, a region in which a contour line is illustrated refers to a region in which the recognition rate is low and short-range communications are not substantially performed. In addition, an empty region in which the contour line is not illustrated refers to a region in which the recognition rate is high and the short-range communications are substantially possible. Therefore, since a recognizable region of FIG. 6B among FIGS. 6A through 6C has the widest region, it may be seen that the recognition rate is in the best state in FIG. 6B. On the other hand, since the recognizable region of FIG. 6A is the narrowest region, it may be seen that the recognition rate is in the lowest state in FIG. 6A.

Referring to FIGS. 6A through 6C, it may be seen that an MST recognition rate of the antenna module is degraded around and at upper/lower portions of the first antenna wiring as illustrated in FIG. 6A as the overall size of the first antenna wiring is decreased. In addition, it may be seen that the recognition rate is increased when the size of the first antenna wiring is increased as illustrated in FIG. 6B.

However, it may be seen that the antenna module according to an embodiment shows the recognition rate of MST communications similar to FIG. 6B, even though the wiring part is formed in the same size as that in FIG. 6A.

As such, the antenna module according to an embodiment significantly reduces the size of the wiring part while providing high recognition rate. In general, as the size of the wiring part is increased, manufacturing costs are rapidly increased. Therefore, when the size of the wiring part is significantly reduced as in an embodiment, manufacturing costs are significantly reduced.

Figure 7:
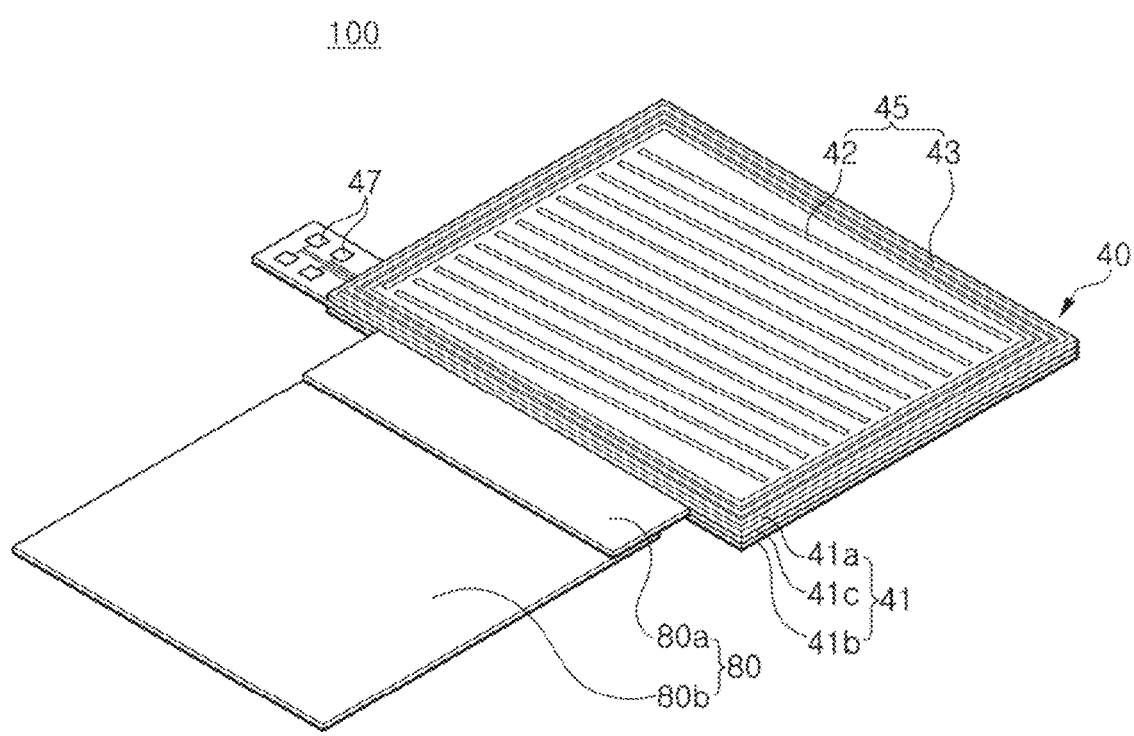
FIG. 7 is a perspective view schematically of an antenna module according to an embodiment.

FIG. 7 is a perspective view schematically illustrating an antenna module according to another embodiment.

Referring to FIG. 7, the antenna module according to an embodiment has a third substrate 41c interposed between the first substrate 41a and the second substrate 41b.

The third substrate 41c is disposed on a side surface of the first magnetic part 80a and is formed in the same or similar thickness as the first magnetic part 80a.

As the third substrate 41c is interposed between the first substrate 41a and the second substrate 41b, the interlayer connection conductors 48 penetrate through the first substrate 41a, the third substrate 41c, and the second substrate 41b disposed in the insulating substrate 41.

Further, the first substrate 41a and the second substrate 41b are bonded to the third substrate 41c at the outside of the first magnetic part 80a. Therefore, the first substrate 41a and the second substrate 41b may maintain a flat shape without a bend at the outside of the first magnetic part 80a by the third substrate 41c as in an embodiment described above.

Further, according to an embodiment, the contact pad 47 is formed on the third substrate 41c. Therefore, the lead wirings 46 of the antenna wiring 45 are connected to the contact pad 47 through the third substrate 41c. However, the contact pad 47 is not limited thereto, and may be variously modified. For example, the contact pad 47 may be disposed on the second substrate 41b, and the like.

Figure 8:
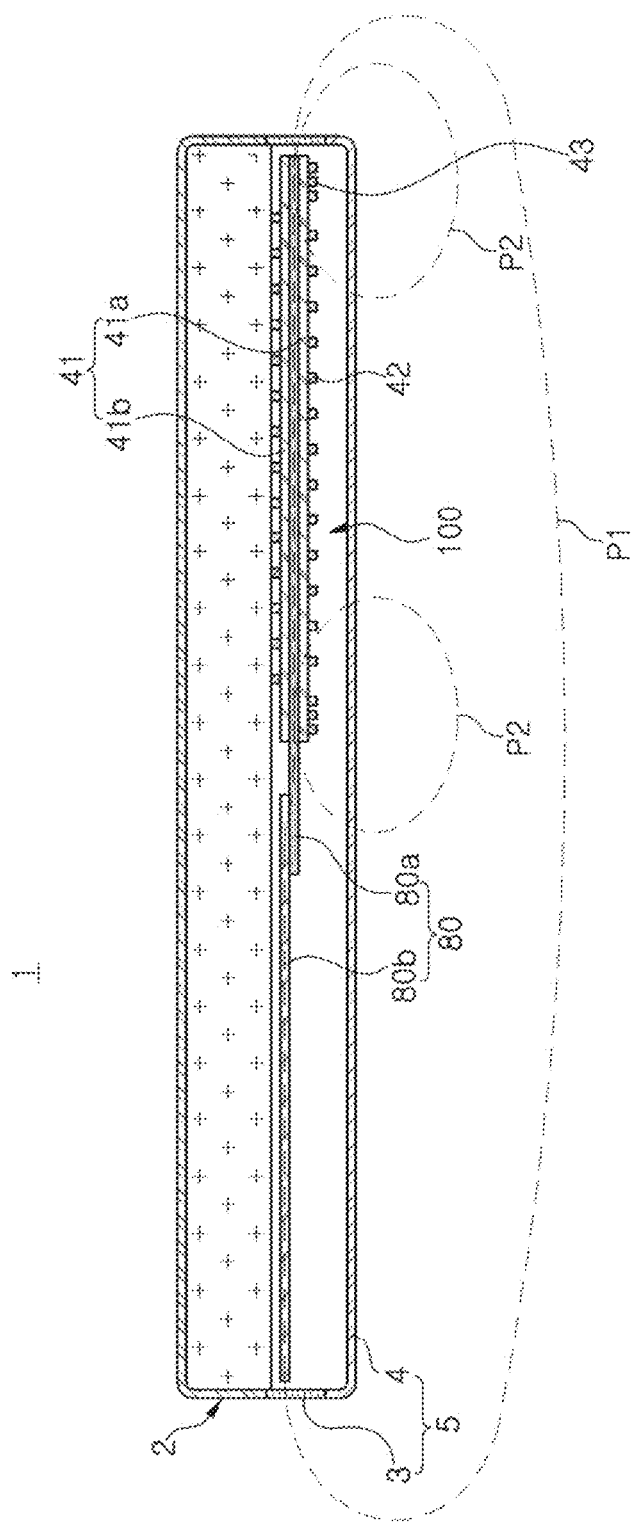
FIG. 8 is a cross-sectional view of an electronic device according to an embodiment.

FIG. 8 is a cross-sectional view of an electronic device according to an embodiment.

Referring to FIG. 8, an electronic device 1 according to an embodiment, which is a portable terminal including the antenna module 100 (FIG. 1) described above, may perform short-range communications through the antenna module 100.

The electronic device 1 includes a terminal body 2, a case 5, and the antenna module 100.

The antenna module 100 is disposed in an inner space formed by the terminal body 2 and the case 5.

The case 5 includes a side cover 3 and a rear cover 4. According to embodiments, the side cover 3 and the rear cover 4 are formed of the same material or may be formed of different materials.

The magnetic part 80 is disposed so that side surfaces of the first magnetic part 80a and the second magnetic part 80b all face the side cover 3. In more detail, one side of the first magnetic part 80a is disposed to be adjacent to one side surface of the side cover 3 in the internal space and one side of the second magnetic part 80b is disposed to be adjacent to the other side surface of the side cover 3.

Accordingly, the magnetic field formed by the first antenna wiring 42 may penetrates through one side surface and the other side surface of the case 5 as illustrated by P1. Therefore, the side cover 3 may be formed of a material that does not shield the magnetic flux.

In addition, the second antenna wiring 43 is disposed to face the rear cover, and accordingly, the magnetic field formed by the second antenna wiring 43 penetrates through the rear cover 4 of the case 5 as illustrated by P2. Therefore, the rear cover 4 may also be formed of a material that does not shield the magnetic flux.

Meanwhile, the electronic device described in an embodiment may include a cellular phone (or a smartphone). However, the electronic device is not limited thereto, but may include any electronic device which may be carried and perform wireless communications such as a notebook, a tablet PC, a wearable device, and the like.

As set forth above, according to embodiments, the antenna module has the second magnetic part which is manufactured in various sizes and is coupled to the first magnetic part. Therefore, the antenna module is easily mounted in various sizes of the electronic devices by changing the size or the shape of the second magnetic part.

Further, cost for manufacturing the antenna module is reduced since the size of the wiring part is significantly reduced while high recognition rate is provided.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna module comprising:
   a wiring part including a first antenna wiring and a second antenna wiring, the second antenna wiring having a spiral shape and on an insulating substrate, and the first antenna wiring an internal region of the second antenna wiring, and disposed in and having a solenoid structure;
   a first magnetic part in a central region of the solenoid structure of the first antenna wiring, the first magnetic part including a portion exposed externally from the wiring part; and
   a second magnetic part coupled to the first magnetic part, wherein the insulating substrate comprises a first substrate and a second substrate, the first substrate on a first surface of the first magnetic part and extending externally from the first magnetic part, and the second substrate on a second surface of the first magnetic part and extending externally from the first magnetic part, and the first substrate and the second substrate are connected to each other externally of the first magnetic part.

2. The antenna module of claim 1, wherein the second magnetic part is surface-bonded to the portion of the first magnetic part.

3. The antenna module of claim 1, wherein the first antenna wiring comprises:
   a first pattern on the first substrate;
   a second pattern on the second substrate; and
   interlayer connection conductors penetrating through the first substrate and the second substrate, the interlayer connection conductors connecting the first pattern and the second pattern to each other.

4. The antenna module of claim 3, wherein the interlayer connection conductors are spaced apart from the first magnetic part.

5. The antenna module of claim 3, wherein the insulating substrate further comprises a third substrate extending externally of the first magnetic part and interposed between the first substrate and the second substrate.

6. The antenna module of claim 5, wherein the third substrate has substantially the same thickness as the first magnetic part.

7. The antenna module of claim 1, wherein the second antenna wiring is on the first substrate.

8. The antenna module of claim 7, wherein the wiring part further comprises contact pads connected to opposite ends of the first antenna wiring and opposite ends of the second antenna wiring, respectively.

9. The antenna module of claim 8, wherein the wiring part further comprises a connection wiring on the second substrate and connecting the first antenna wiring and the contact pads with each other.

10. The antenna module of claim 1, wherein the first magnetic part and the second magnetic part have different magnetic permeabilities.

11. The antenna module of claim 1, wherein the first magnetic part and the second magnetic part comprise a same material and have different fragmentations.

12. An electronic device comprising:
   an antenna module including,
      a wiring part having a first antenna wiring and a second antenna wiring, the first antenna wiring having a solenoid structure, the second antenna wiring on insulating substrate and having a spiral shape,
      a first magnetic part in central region of the solenoid structure of the first antenna wiring, and
      a second magnetic part coupled to the first magnetic part; and
   a case including an internal space, a side cover, and a rear cover,
   wherein the insulating substrate comprises a first substrate and a second substrate, the first substrate on a first surface of the first magnetic part and extending externally from the first magnetic part, and the second substrate on a second surface of the first magnetic part and extending externally from the first magnetic part,
   the first substrate and the second substrate are connected to each other externally of the first magnetic part,
   the antenna module is in the internal space of the case, and
   a side of the second magnetic part is adjacent to the side cover of the case.

13. The electronic device of claim 12, wherein a portion of the second antenna wiring is on a side surface of the first magnetic part.

14. The electronic device of claim 13, wherein
   the first antenna wiring is in an internal region of the second antenna wiring.

15. The electronic device of claim 13, wherein the second antenna wiring faces the rear cover.

16. The electronic device of claim 13, wherein the electronic device is configured to conduct short range communications through the antenna module.

17. The electronic device of claim 13, wherein the electronic device comprises a cellular phone, a notebook, a tablet personal computer, or a wearable device.

* * * * *